United States Patent Office 3,434,670
Patented Mar. 25, 1969

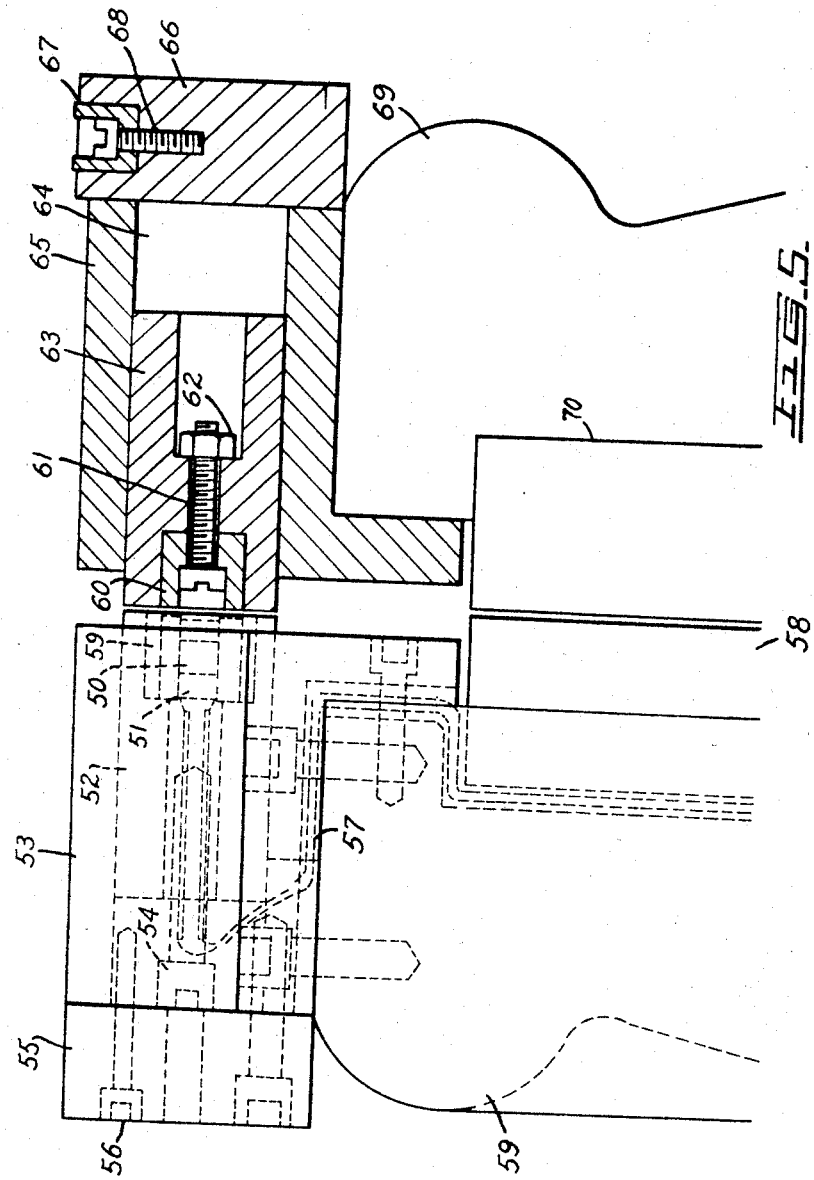

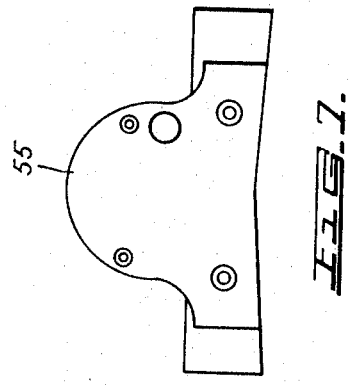
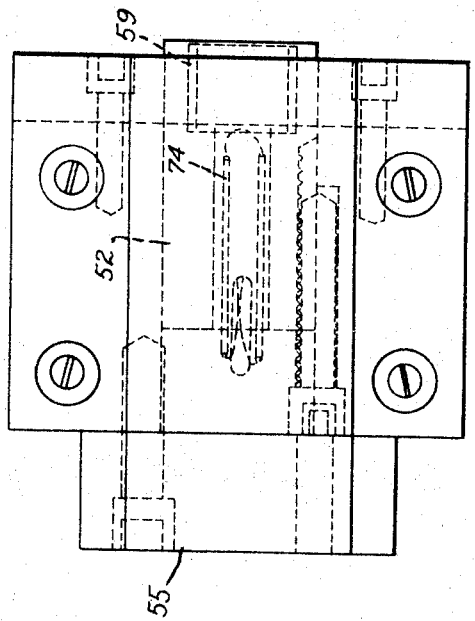

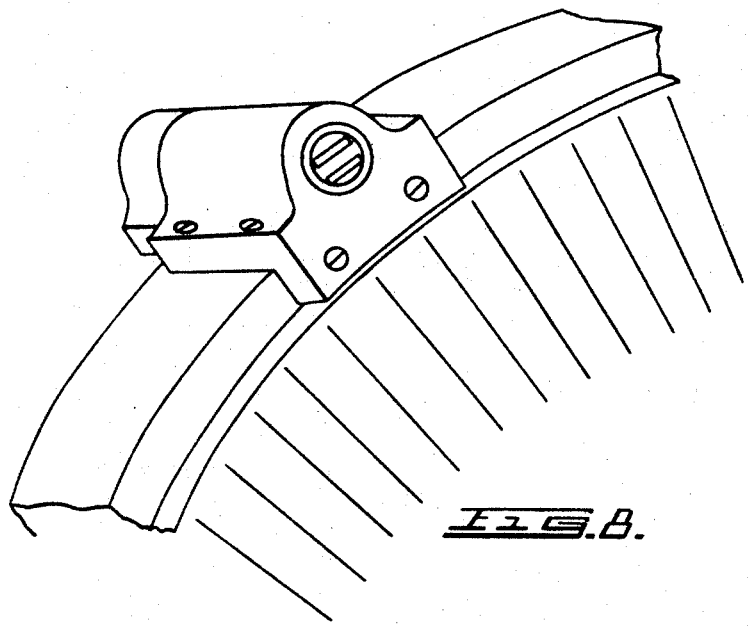
Fig. 8.
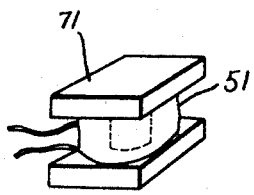
Fig. 9.
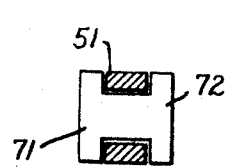 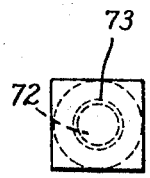
Fig. 10. Fig. 11.

3,434,670
APPARATUS FOR MEASURING OUT OF TRAM AND PLATE SEPARATION OF DISC REFINERS
William Donald May, Montreal, Quebec, Canada, assignor to Pulp and Paper Research Institute of Canada, Pointe Claire, Quebec, Canada
Filed July 7, 1966, Ser. No. 563,408
Int. Cl. B02c 7/06, 7/14
U.S. Cl. 241—37                                    9 Claims

ABSTRACT OF THE DISCLOSURE

An apparatus for measuring the distance between and misalignment of plates in a disc refiner. A plurality of sensing coils are spaced around the periphery of one of the discs and at least one magnet is mounted adjacent the periphery of the other disc. Upon rotation of the discs relative to each other, current pulses are produced in the coils which have a value dependent upon the spacing between the sensing coil and the magnet. A means for determining the value of this signal, such as an oscilloscope, is provided in order to accurately measure both out of tram and plate separation.

---

This invention relates to an apparatus for measuring plate separation and out of tram of disc refiners.

Disc refiners are widely used for refining material such as a pulp suspension or a mixture of wood chips, water and chemicals. There are both single disc and double disc refiners. Both consist of two discs mounted substantially coaxially with their faces almost in contact. In a single disc refiner one disc rotates, while in the double disc refiner both discs rotate usually in opposite directions. In each case, therefore one disc rotates relative to the other disc. The material to be refined enters the space between the discs at or near the centre of the discs and is discharged at the periphery of the discs. The opposed faces of the discs have patterned plates which refine the material as it travels towards the periphery. The usual size of the discs of commercial machines is from about 36 inches to 54 inches and these discs are rotated at speeds up to about 1800 revolutions per minute.

For most purposes the clearance between the plates is critical. For example, where the feed is wood chips with water the chips are broken into fragments between the plates to emerge at the periphery of the discs as wood pulp. The clearance between the plates may vary from about 0.050 inch at the inboard end of the plate pattern to 0.005 inch or less at the periphery. If during the operation of the refiner there is a significant change in the spacing, the pulp fibers may be too coarse. By the time that this coarseness becomes apparent a large batch may have become contaminated with an unacceptable product. Too close a plate clearance may result in the pulp being excessively refined.

The undesirable situation described above can occur where the average spacing between the discs is too great and it can also occur where the spacing differs around the periphery of the discs so that the pulp ejected at one position will be coarser than pulp produced at another location.

The average disc separation once the discs are rotating is different from that which occurs when the refiner is at rest. This is caused by so-called fling-back of the rotating discs due to their centre of mass lying beyond the end of the shaft. Fluctuating loads also cause changes in the separation of the discs. Differences in the spacing around the periphery may occur where the plane of a disc is not perpendicular to its shaft and it may also occur where the shaft is out of tram. This means that in the case of a double disc refiner the shafts supporting the discs are not completely coaxial.

Means have previously been provided for controlling changes in the average disc separation. This separation is usually controlled by hydraulic or mechanical means in which one disc is advanced against the other or against the material between the discs. The system is designed to run so that the machine is never overloaded. Although a system of this type may be satisfactory for the purposes of avoiding damage to the machine, a relationship is created between the disc separation and the amount of feed, if therefore, there is some variation in the rate of feed, the separation and hence the coarseness of the product changes, without the operator necessarily being aware that such is occurring.

Differences in separation due to the plane of the discs not being perpendicular to their shafts are unlikely to cause a problem in a properly designed refiner. This fault occurs due to initial manufacture or damage during the life of the refiner. The difference in spacing due to this condition is unlikely to vary materially between when the refiner is running and at rest. Measurements can therefore be made when the machine is at rest.

The situation is, however, entirely different with respect to the out of tram condition where changes in the axis of the shafts result in a variable separation. Out of tram frequently occurs during the operation of a refiner due to the differential expansion of different parts of the machine. The refiner may dissipate thousands of horsepower of energy into the wood while defibering it and this appears mostly as heat in the disc area. The flow of heat from the discs through the supporting bearings into the base plate of the machine can cause differential expansion and consequently an out of tram condition. The magnitude of the effect can be appreciated from the fact that a refiner having an out of tram when at rest of the order of 0.001 inch to 0.002 inch may have out of tram of 0.0010 inch during operation, and it will further be noted that this out of tram distance during operation may be several times the average spacing at the periphery.

As both disc separation and out of tram change while the machine is running and at a time when the space between the discs is filled with hot water, steam, wood fragments and wood pulp, the usual methods of measuring cannot be used.

One of the objects of this invention is to provide an apparatus for measuring the separation of the discs when the refiner is working.

Another object of this invention is to provide an apparatus for measuring out of tram of the discs while the refiner is working.

In accordance with this invention in its broadest aspect, a disc refiner is provided in which discs are mounted substantially coaxially and in face to face relationship and in which at least one of the discs is rotatable to refine material between the discs. Means is provided for measuring plate separation and out of tram comprising at least one sensing coil mounted on one of the discs to provide a signal having a value dependent on the spacing between the sensing coil and the other of said discs at a plurality of relative positions of said discs and means enabling the value of said signal to be determined.

In the drawings which illustrate the preferred embodiments of this invention:

FIGURE 5 is a sectional detailed elevation view of the coil and magnet shown in FIGURE 1 together with their respective holders;

FIGURE 6 is a plan view of the coil holder and coil shown in FIGURE 5;

FIGURE 7 is an end elevation view of the cap for the coil holder shown in FIGURES 5 and 6;

FIGURE 8 is a perspective view showing the coil and coil holder of FIGURES 5 to 7 in position;

FIGURE 9 is a perspective view of an individual coil;

FIGURE 10 is a sectional view of the coil shown in FIGURE 9;

FIGURE 11 is an end view of the coil shown in FIGURE 10;

Figure 1:
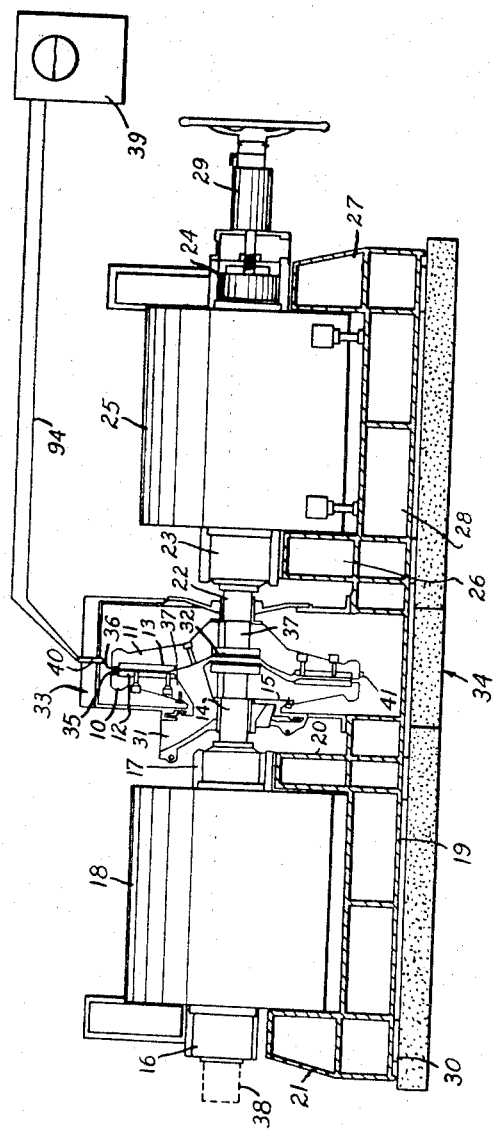
FIGURE 1 is an elevation view partly in section of a double disc refiner including measuring means in accordance with this invention.

Referring now to FIGURE 1 of the drawings, the double disc refiner illustrated comprises a pair of discs 10 and 11 mounted in face to face relationship. The inner face of disc 10 has a plate 12 for refining the pulp and similarly, disc 11 has a plate 13. Disc 10 is connected to shaft 14 by web 15 and is thus caused to rotate about the axis of shaft 14. Shaft 14 is supported by bearings 16 and 17 and is driven by motor 18. A supporting framework is provided including baseplate 19 upon which are mounted bearing supporting structures 20 and 21 for bearings 17 and 16 respectively. Similarly, disc 11 is mounted on shaft 22 for rotation about the axis of such shaft. Shaft 22 is supported by bearings 23 and 24 and is driven by motor 25 in a direction different from that of shaft 14. Supporting structures 26 and 27 are provided for bearings 23 and 24 and these are mounted on baseplate 28. A hydraulic mechanism generally indicated at 29 acts axially on shaft 22 to advance disc 11 towards disc 10 to an extent depending on the load.

The baseplates 19 and 28 are supported by wedges 30 which enable the alignment of shafts 14 and 22 to be adjusted.

Considering now the discs in greater detail, a feed inlet 31 supplies the material to a chamber 32 from whence the material passes between plates 12 and 13 to undergo a refining action. The refined material is discharged to the interior of housing 33 from whence it goes to outlet 34. In accordance with this embodiment of the invention a series of coils 35 is secured to disc 10 and there is a magnet attached to disc 11. Coil 35 has connecting wires 37 which pass behind plate 12 through an axial bore in shaft 14 to slip rings 38 and from thence to oscilloscope 39. The coils 35 are attached at equidistant points around the periphery of disc 10. As magnet 36 sweeps past each of coils 35 a current pulse is induced in the coil the magnitude of which depends on the distance of magnet 36 from coil 35. With an arrangement of six coils and one magnet twelve such signals will be generated for one revolution of the refiner. If the machine is out of tram the signals will be weaker where the plate separation is large and stronger where it is small. Oscilloscope 39 provides a convenient way of displaying the signals. If a time base sweep of equal duration to one revolution of the refiner is put on the X-plate of the oscilloscope and the output from the coils is fed on to the Y-plate a recurring pattern of twelve signals appears. If the refiner is running in tram the signals will be of equal height. This height is a function of the disc separation and, therefore, enables disc separation to be estimated.

Figure 2:
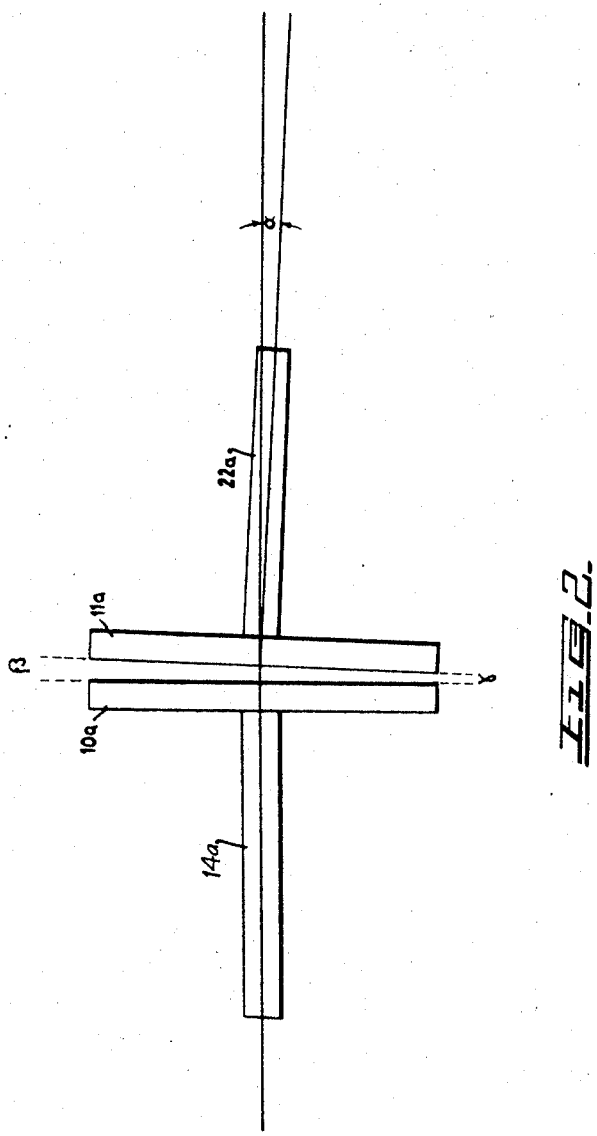
FIGURE 2 is a diagrammatic representation of an out of tram situation.

If as illustrated in FIGURE 2, the refiner is out of tram, then the axes of shafts 14A and 22A which support discs 10A and 11A respectively will deviate from the coaxial by an angle indicated at $\alpha$ and there will be corresponding differences in separation $\beta$ and $\gamma$ at different sides of the discs. The difference in spacing where the refiner is out of tram results in differences in the signals and the difference in height between the maximum and minimum signal indicates the total amount of tram. The average height of the signals will be a measure of the disc separation. In order to ensure that the time base sweep is equal to the time of one revolution of the refiner, it is necessary to synchronize the two. This is done by means of a triggering coil 40 mounted on the stationary part of the refiner and connected to oscilloscope 39 by leads 94 and a triggering magnet 41 on the same disc 11 which carries the signal magnet 36. In FIGURE 1 the triggering coil is illustrated as being placed in the 12 o'clock position for convenience of illustration, however, it may be preferable to place it in the 9 o'clock position in which case the oscilloscope time base will start at 9 o'clock and will finish at approximately 9 o'clock. The middle of the sweep can be more closely defined by mounting a similar marker coil diametrically opposite to the trigger coil which may be arranged to produce a small pulse defining the 3 o'clock position. By marking out the time base display in this manner the out of tram position can be determined either in terms of a clock face or in degrees.

Figure 3:
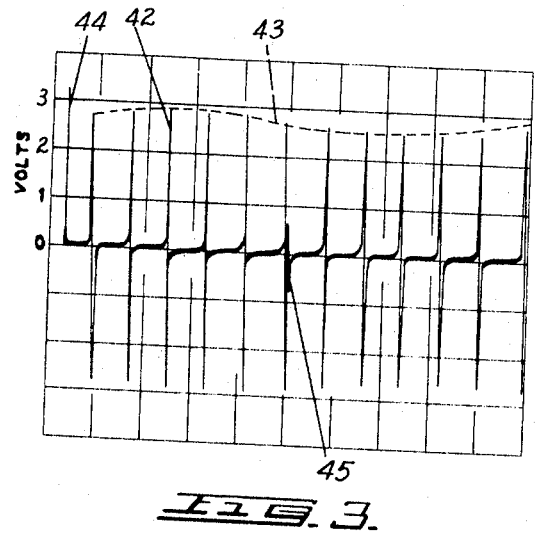
FIGURE 3 illustrates an oscilloscope pattern.

FIGURE 3 illustrates the pattern on the oscilloscope in which there are signals 42 of a strength depending upon the spacing of the magnet and coil and which displays a wave form indicated by the dotted line 43 indicating the out of tram. The time base signal is at 44 and the 3 o'clock marker signal is indicated at 45.

Figure 4:
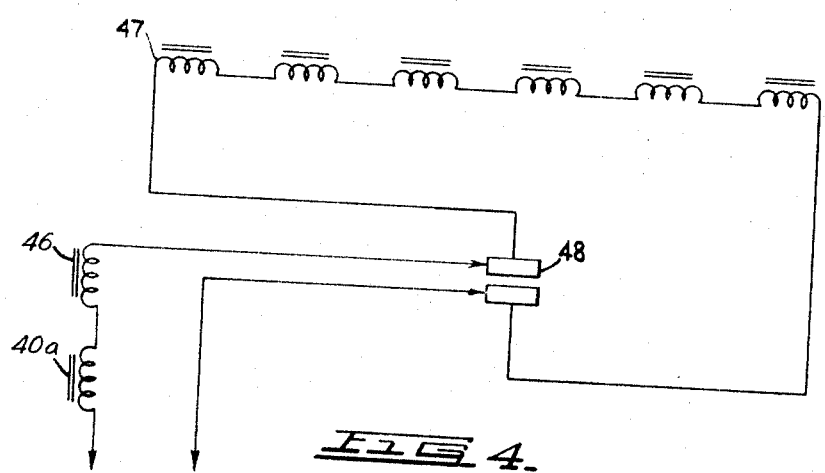
FIGURE 4 is a circuit diagram for the apparatus illustrated in FIGURE 1.

FIGURE 4 shows the circuit diagram in accordance with which sensing coils 47 are connected in series and to slip rings 48 through one of which triggering coil 40A and marker coil 46 are also connected in series with sensing coils 47.

In FIGURES 5, 6 and 7 a coil and coil holder are illustrated and FIGURE 5 also illustrates a magnet and magnet holder. These are shown secured to the exterior periphery of the discs but it will be appreciated that if the rims of the refiner discs are deep enough coils and magnets may be mounted in suitable carriers and set into them. In FIGURE 5 coil 50 has a winding 51 and is positioned in a carrier 52 which engages in a bore in holder 53. The position of carrier 52 within holder 53 can be adjusted using adjustment screw 54. A cap 55 secured in place by bolts 56 closes off the rear end of the bore in the holder. Leads 57 are connected to winding 51 and pass between plate 58 and disc 59. Coil 50 is potted in place with epoxy resin as indicated at 59.

As also shown in FIGURE 5, magnet 60 is located in carrier 63 by screw 61 and nut 62. Carrier 63 engages in a bore in holder 65. The position of carrier 63 in holder 65 can be adjusted by an adjusting screw similar to that of adjusting screw 54 in coil holder 53. A cap 66 closes off the end of bore 64 and provides a convenient mounting for marker magnet 67 which is held in position by screw 68. Holder 65 is mounted on disc 69 which carries a plate 70.

Figure 12:
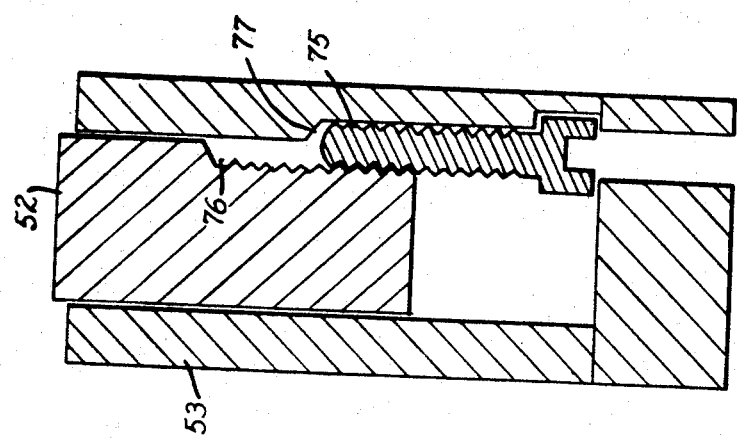
FIGURE 12 is a sectional view of a coil and coil holder.

As shown in FIGURE 9, the winding 51 of coil 50 is mounted on a soft iron former 71 having a shape approximately that of the letter H the cross bar 72 of which is round in cross-section to facilitate the winding of the coil. About 60 turns of fairly thick copper wire forms a robust but sensitive coil. The wire of coil 51 is insulated from the soft iron core by a thin layer of epoxy resin 73. The coil which has been described is carried in a rag-filled phenolic bush or carrier 52 (shown in FIGURES 5 and 6) and potted in place with epoxy resin. Phenolic resin was found to the desirable for the bush because of its resistance to the temperatures and chemical conditions of the refiner and its reasonably small friction co-efficient against the casing. Thick copper leads 74 are also potted in the bush. The ends of these are connected to the coil before potting. As shown in FIGURE 12, an adjustment mechanism is incorporated in holder 53 so that the coil can be moved forward or backward over a limited distance. This is provided by adjustment screws 75 which engages bush 52. A groove 76 in bush 52 has a thread tapped in it to mate with that of screw 75 while a groove 77 in the holder 53 is untapped.

Figure 13:
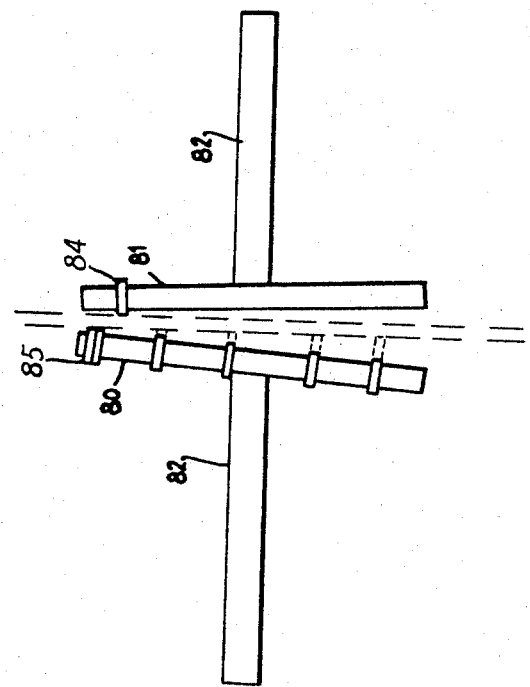
FIGURE 13 is a diagrammatic view illustrating a condition of runout.

The apparatus which has been described can be used for compensating for run-out of the discs as illustrated in FIGURE 13 which shows in exaggerated form a run-out situation in which discs 80 and 81 have planes which are not perpendicular to the axes of shafts 82. Run-out tends to be a feature of the construction of the refiner and is unlikely to alter as the refiner starts up or as the running conditions change. It can, therefore, be allowed for when measuring the plate separation and out of tram. However, it adds a complicating factor to the quick and easy reading of the signal on oscilloscope 39. It will be noted that if the discs with magnet 84 on it has run out, there is no run-out to the plane of rotation of the magnet. It remains at right angles to the shaft. If, however, the coil disc 80 has run out and all the coils 85 protrude an equal distance from its rim, each coil will rotate in a different plane though all of these will be at right angles to the refiner shaft 82 and to the plane of the magnet 84. Different signal strengths will then be received from each of coils 85. This effect of runout can be compensated for by adjusting the position of the coils with respect to the disc 80 as shown dotted on FIGURE 13 so that all the planes of rotation are identical. This adjustment is achieved by holding coil disc 80 stationary while rotating the magnet disc 81. The signal from each coil in turn is fed to the oscilloscope and the position of the coils is adjusted so that they all give the same signal when held opposite a convenient fixed point on the frame of the machine. The planes of all coils will then coincide and runout has been compensated for. As only one disc rotates in this operation, no out of tram signal appears to confuse the adjustment.

As the system is a dynamic one in which signals are only obtained from the coils when there is relative motion between them and the magnet, special procedures must be adopted for calibration. This can be done either on the refiner or on a calibration rig. To calibrate the system on the refiner, spacers are mounted on the rim of disc 69 (see FIGURE 5). The faces of these are of phosphor bronze or similar bearing metal as they are required to touch the rim of the opposite discs momentarily during calibration. They ensure that when the refiner is running and the discs are closed together until the noise of the spacers touching the opposite rim face is heard, the plates are just touching. The signals from the coils are read out, and the change in their value recorded as the discs are separated in steps of .001" by manipulation of the disc locating mechanism built into the refiner. A calibration curve is thus obtained.

The calibration rig is a small bench device which incorporates the features of the refiner esssential to calibration The latter is carried out in a similar fashion to that described in the preceding paragraph.

Figure 14:
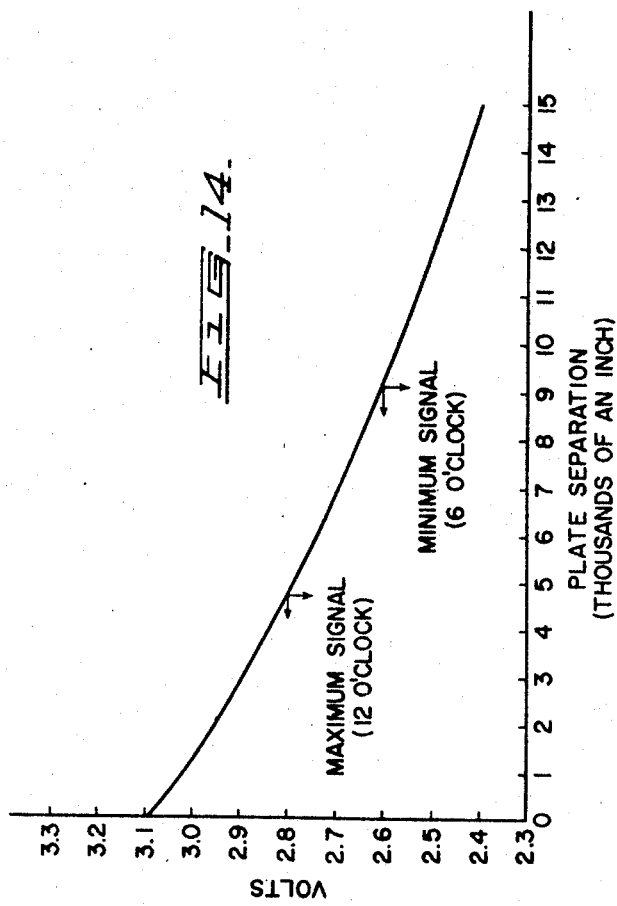
FIGURE 14 illustrates a calibration curve.

A calibration curve is shown in FIGURE 14 where interpretation of the signals in FIGURE 3 is demonstrated. It is seen that in this particular case the refiner was running .004" out of tram in the vertical plane, the plates being closest in the 12 o'clock position and widest at 6 o'clock.

Figure 15:
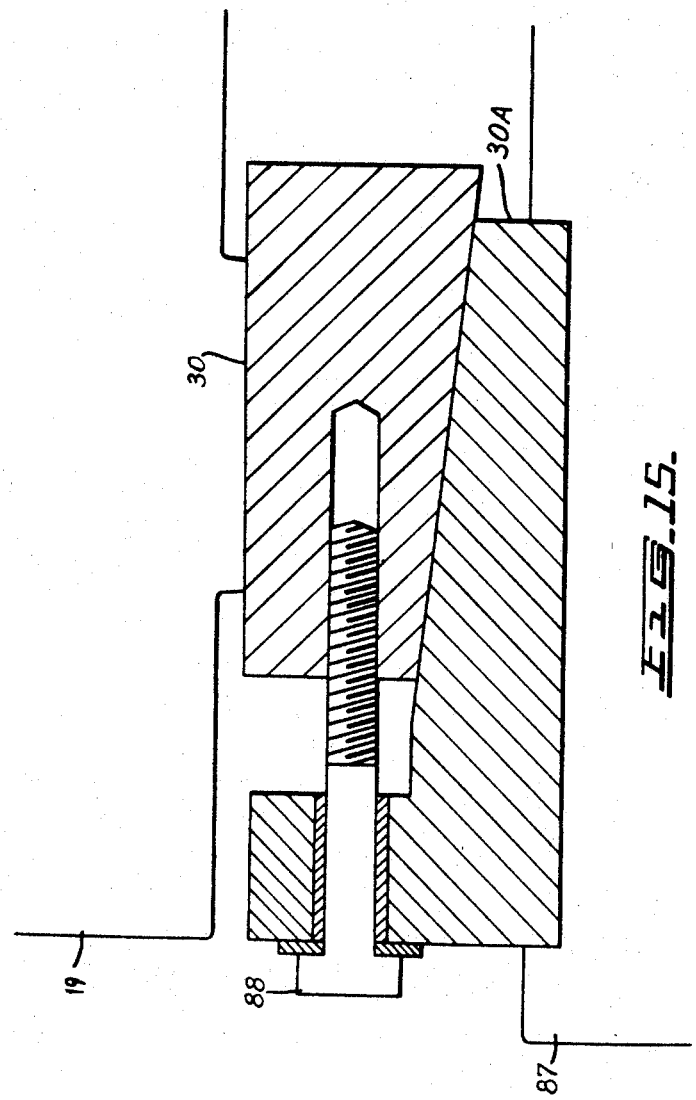
FIGURE 15 is a detailed sectional elevation view corresponding to part of FIGURE 1 and illustrating wedges to correct for out of tram.

In FIGURE 15, adjustable wedge 30 is slidable with respect to fixed wedge 30A to raise or lower the height of refiner base 19 above concrete base 87. An adjustment screw 88 can be turned to change the position of adjustable wedge 30. Advancing or retracting the adjustable wedge 30 flexes the base of the refiner and therefore changes the alignment of the discs. It should be noted that the main misalignment of the discs which occurs when the machine is running is from top to bottom with the discs opening at the top and closing at the bottom. Such vertical out of tram is readily corrected by the use of wedges as shown in FIGURE 15. Out of tram in the horizontal direction is usually an initial fault in the machine rather than a consequence of running conditions and is corrected with the machine stopped. If the out of tram is shifted slightly from the vertical direction it can be compensated for by altering the wedges preferentially on one side of the refiner.

Figure 16:
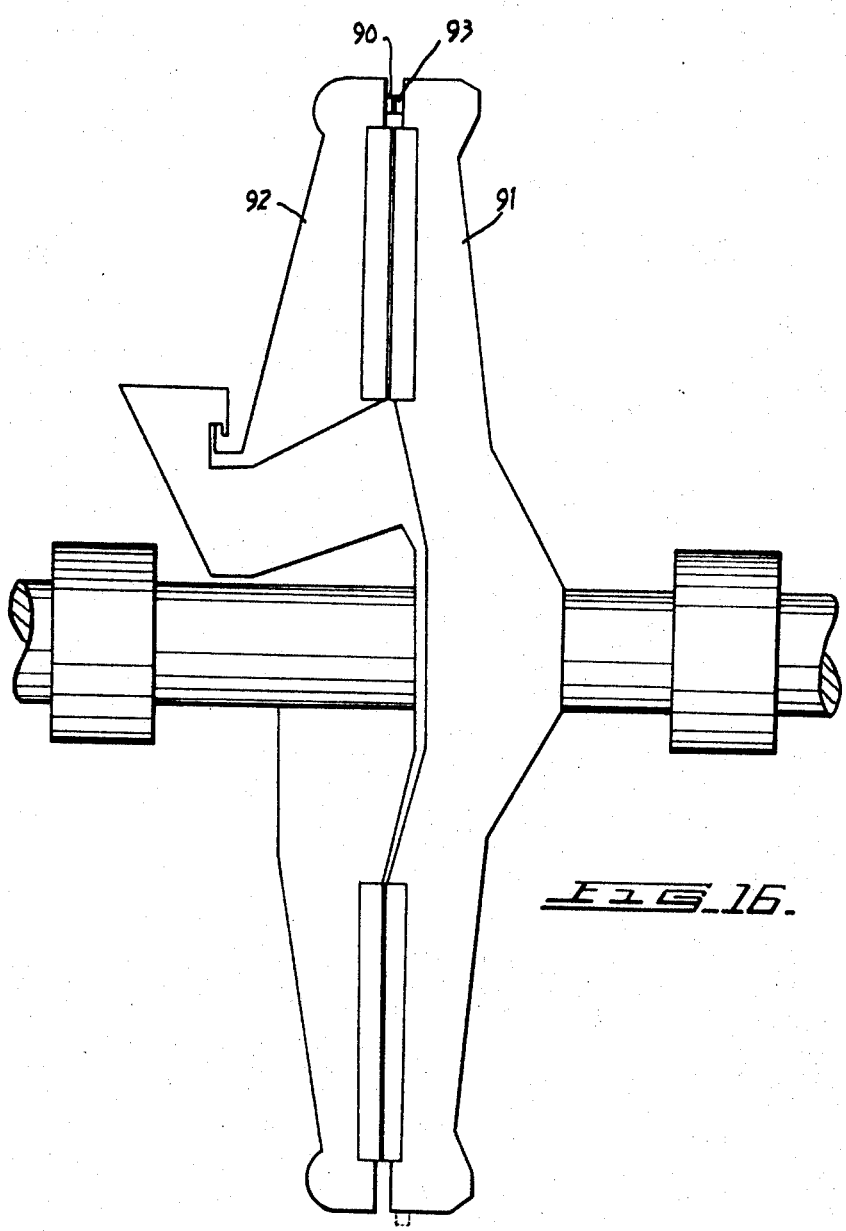
FIGURE 16 illustrates an alternative embodiment of the invention.

FIGURE 16 illustrates another embodiment of the invention. Instead of using a system of coils and magnets, a single coil 90 is attached to discs 92 in such a way that its face sweeps round the face of disc 91. The inductance of coil 90 then varies with its distance from the other disc 91, and gives both plate separation and out of tram displacement. Energy is suppiled in the coil as an alternating voltage of moderately high frequency and the coil inductance is measured by a bridge method.

An alternative is to wind two coils on the same former and use a mutually inductive system in which the voltage induced in the secondary coil when an alternating voltage is applied across the primary one is measured. The induced voltage depends on the mutual inductance of the system which again is dependent on the distance of the other disc. A mutual inductance system tends to lend itself more readily to display than the self inductance system described. Both canont be used however in refiners where the discs consist of paramagnetic materials such as stainless steels. They are applicable where various sorts of mild steel, and other ferromagnetic materials are used. They have the disadvantage that run-out on the opposite disc canont be compensated for. These objections are overcome in a discontinuous system.

A single coil as in FIGURE 16 can be used to measure the plate separation at discrete points. This is arranged by fitting protruding ferromagnetic slugs at points around the opposite disc, as indicated at 93 in FIGURE 16. As the coil sweeps past each of these projections the inductance in the coil changes and the distance between coil and slug is determined from this.

A singly wound coil can be used to measure inductance or a doubly wound one to measure mutual inductance. Run-out can be compensated for by adjusting the degree of protrusion of the slugs. The inherent disadvantage in this system is that the time of passage of a slug over a coil is small. A high frequency alternating voltage is therefore needed to obtain meaningful modulation by the change in inductance or mutual inductance. The use of such high frequencies introduces screening and noise difficulties, and calls for sophisticated electronic equipment.

Another alternative is the eddy current method which also uses a single coil as illustrated in FIGURE 16. The energy dissipated in it due to the induction of eddy currents in the opposite disc is measured. This energy is a measure of the separation between the coil and the opposite disc. The method is suitable for a continuous measure of the disc separation when these are made of paramagnetic materials such as stainless steels. It requires radio frequency excitation, and consequently introduces electronic complications because of the high frequencies involved.

All the methods described above lend themselves to convenient calibration, as relative movement between the discs is not necessary for generation of the signal. They can thus be calibrated on the bench, or once mounted on the refiner, with the latter stationary.

In connection with the coil and magnet method, described with the aid of FIGURES 1 to 15, the trace on the oscilloscope consists of a large basic signal representing the mean disc separation with a small difference signal superimposed on it which represents the amount of out of tram. Accurate measurement of the latter is, therefore, difficult because of the presence of the larger signal. It is, therefore, convenient to be able to cancel out the plate separation signal. This is done in the coil and magnet method by mounting a second magnet diametrically opposite to the first one. The magnets will thus pass diametrically opposite coils simultaneously, providing an even number of coils are used.

The coils are connected in opposition so that the signals tend to cancel each other. If the refiner is in tram, both signals are of equal magnitude, and no resultant is obtained. If the machine is out of tram, only the difference in the signals due to this is displayed.

Accurate positioning of the coils and magnets is essential to obtain complete cancellation of the main signal. Slight misplacements give rise to a residual signal even when the shape of the pulse generated in each coil is identical because of the resulting phase difference between them. The coils and magnets must be positioned to within a few thousands of an inch to ensure a sufficiently low residual signal in the in tram condition.

A further modification which can be applied to the coil and magnet method is to use electro-magnets instead of permanent magnets. The electro-magnets consist of similar coils to the sensing coils and are fed by direct current through a similar slip ring system. The system has the advantage that the change in field strength which permanent magnets undergo with the passage of time, and which leads to a drift in the calibration of the system is obviated. By maintaining a constant current through the electro-magnets, an unchanging field is obtained. Another advantage is that a change in sensitivity can be readily arranged by changing the current while the machine is running. This is sometimes convenient.

I claim:

1. In a disc refiner in which discs are mounted substantially coaxially and in face to face relationship and in which at least one of the discs is rotatable to refine material between the discs, means for measuring plate separation and out of tram comprising at least one sensing coil mounted on one of said discs to provide a signal having a value dependent on the spacing between the sensing coil and the other of said discs at a plurality of relative positions of said discs and means enabling the value of said signal to be determined.

2. In a disc refiner in which discs are mounted substantially coaxially and in face to face relationship and in which at least one of the discs is rotatable to refine material between the discs, means for measuring plate separation and out of tram comprising a plurality of sensing coils spaced around the periphery of one of said discs and at least one magnet mounted adjacent to the periphery of the other of said discs, said coils and magnet being arranged so that upon relative rotation of said discs current pulses are produced in said coils having values dependent on the spacing between the sensing coil and the magnet and means enabling the value of the signal provided by the current pulse to be determined.

3. In a disc refiner in which discs are mounted substantially coaxially and in face to face relationship and in which at least one of the discs is rotatable to refine material between the discs, means for measuring plate separation and out of tram comprising at least one sensing coil mounted on one of said discs having an inductance of a value dependent on the spacing between the sensing coil and the other of said discs and means for measuring the inductance of such coil at a plurality of positions of said discs.

4. A discs refiner as in claim 1, in which means are provided on at least one of said discs to give a marker signal to relate the sensing coil to the position of the discs of the refiner.

5. A disc refiner as in claim 1, in which the means for determining the value of said signal is an oscilloscope.

6. A refiner as in claim 1, including means for adjusting the tram of the refiner during the operation of the refiner.

7. A disc refiner as in claim 1, in which the sensing coil is adjustably mounted for movement towards or away from the disc other than that upon which it is mounted.

8. A disc refiner as in claim 2 in which the sensing coils and magnet are adjustably mounted for movement towards or away from each other.

9. A refiner as in claim 2 in which a magnet is mounted on one of said discs and a coil is mounted on a stationary portion of the refiner to provide a marker signal to relate the signal from the sensing coil to the position of the discs of the refiner.

References Cited

UNITED STATES PATENTS 2,548,599   4/1951   Garr _____ 241—37
3,302,893   2/1967   Feder et al. _____ 241—37

GERALD A. DOST, *Primary Examiner.*

U.S. Cl. X.R.

241—256